July 5, 1955

H. D. HURT 2,712,338

INNER TUBE FOR PNEUMATIC TIRES

Filed June 6, 1952

INVENTOR.
Hansford D. Hurt.
BY
Wilfred E. Lawson
ATTORNEY.

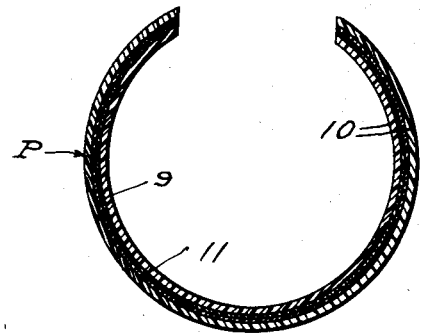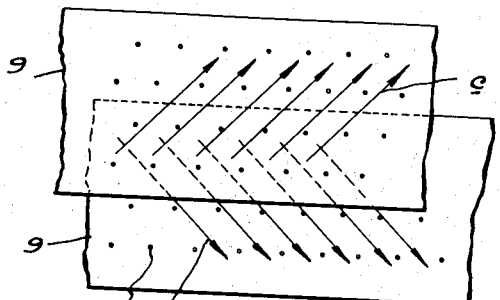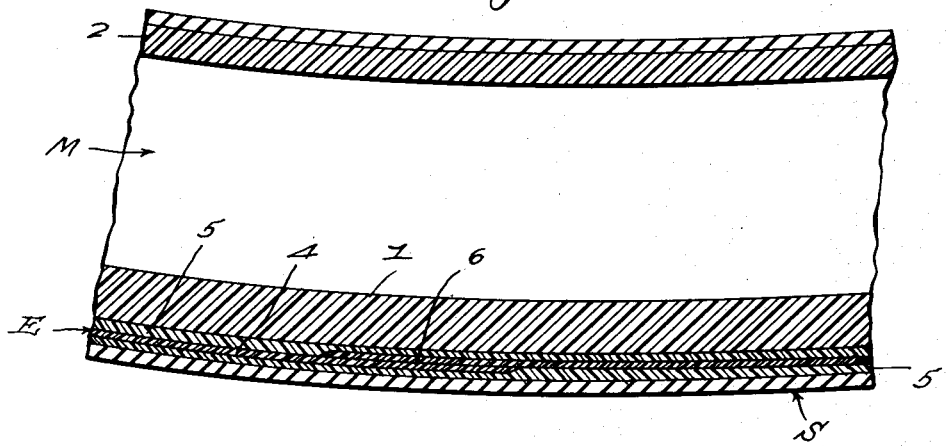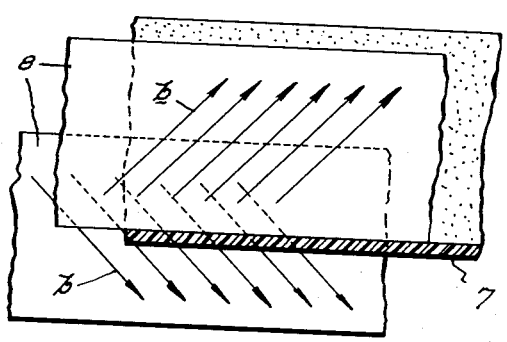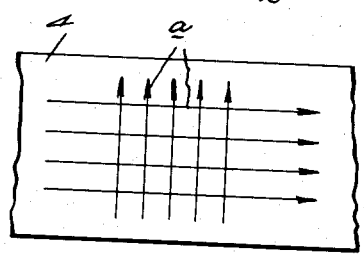

United States Patent Office 2,712,338
Patented July 5, 1955

2,712,338

INNER TUBE FOR PNEUMATIC TIRES

Hansford D. Hurt, Arlington, Calif.

Application June 6, 1952, Serial No. 292,114

4 Claims. (Cl. 152—347)

This invention relates to an inner tube for pneumatic tires such as now generally used in connection with motor vehicles, bicycles and the like and it is primarily an object of the invention to provide a tube of an antiblowout type that will greatly prolong the useful life of both new and used tires with which it may be employed.

It is also an object of the invention to provide an inner tube constructed in a manner whereby is substantially eliminated rim cuts and which also substantially eliminates loss of air from within the tube.

An additional object of the invention is to provide a tube including a reinforcing means of a character to serve as a sheet diaphragm partition wall which also provides an effective preventive of blow outs.

A still further object of the invention is to provide a tube of this kind possessing a tacky or gummy structure at normal temperature that will adhere to puncturing objects to prevent air leakage around such object while in penetration.

An additional object of the invention is to provide a tube including a reinforcing means comprising a processed textile plastic shield which serves as a protection for the tube and also for the tire casing to which the tube is applied.

The invention consists in the details of construction and in the combination and arrangement of the several parts of my improved inner tube for pneumatic tires, whereby certain advantages are attained, as will be hereinafter more fully set forth.

In order that my invention may be better understood, I will now proceed to describe the same with reference to the accompanying drawings, wherein:

Figure 6 is a transverse sectional view taken through another embodiment of reinforcing means;

Figure 7 is a fragmentary sectional view taken substantially on the line 7—7 of Figure 1;

Figure 8 is a fragmentary schematic view relating to the reinforcing or protecting element as illustrated in Figures 1, 2 and 7;

Figure 9 is a fragmentary schematic view relating to the reinforcing or protecting elements as illustrated in Figures 4 and 5;

Figure 10 is a fragmentary schematic view relating to the reinforcing or protecting elements as illustrated in Figure 6.

Figure 1:
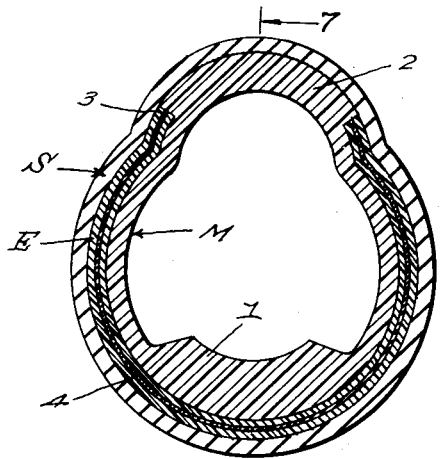
Figure 1 is a cross sectional view taken through a tube constructed in accordance with an embodiment of the invention.
Figure 2:
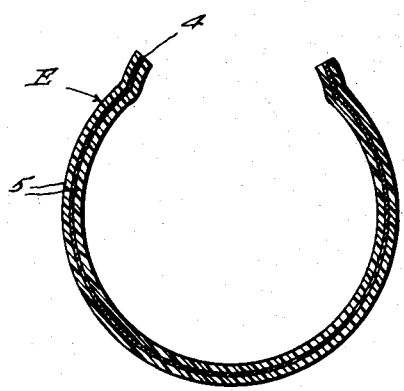
Figure 2 is a cross sectional view of the reinforcing element as comprised in Figure 1.

In the embodiment of the invention as particularly illustrated in Figures 1, 2, 3 and 7, M denotes an inner tubular member of relatively thick material such as a soft synthetic rubber or plastic possessing a tacky or gummy structure at normal temperature and which will stick or adhere to puncturing objects and thereby preventing air leakage around such objects while in penetration. The tread portion of this member M is inwardly increased in thickness as at 1 to further increase the effectiveness of the member. The base portion of the member M opposed to the portion 1 is outwardly or exteriorly increased in thickness as at 2 providing along its side margins with the outwardly facing continuous shoulders 3. The transverse dimension of this base portion 2 closely approximates the corresponding dimension of the wheel rim to which the tire casing or carcass is applied although this is not essential though beneficial.

The reinforcing or protecting element E as comprised in this embodiment of the invention includes a central sheet 4 of a solidified textile or fiber plastic material suitably processed for high strength and dimensional stability, preferably nylon or rayon although other textile plastics may be used such as orlon, dacron, dynel, and acrilan. Nylon or rayon is preferred as this material can be best "oriented" and "heat set" to give greater strength and dimensional stability.

This sheet 4 is of requisite dimensions and is interposed between the outer lamination 5 of a material similar to that of the member M hereinbefore referred to. The element E is of such dimensions as to be disposed circumferentially around the member M and snugly fitting between the shoulders 3 of the portion 2. The thickness of the element E is such as to have its periphery substantially flush with the outer or peripheral face of the portion 2 of the member M.

Disposed over and encasing the assembled member M and element E is an outer sheathing S of natural or synthetic rubber of a non-adhesive nature at normal temperature thereby providing the usual smooth exterior surface.

The member M, the element E and the sheath S are vulcanized together to produce the finished product.

In the assembly of the element E it is to be noted in Figure 7 of the drawings that the end portion of the sheet 4 overlap, as at 6 to assure a maximum of efficiency.

Figure 4:
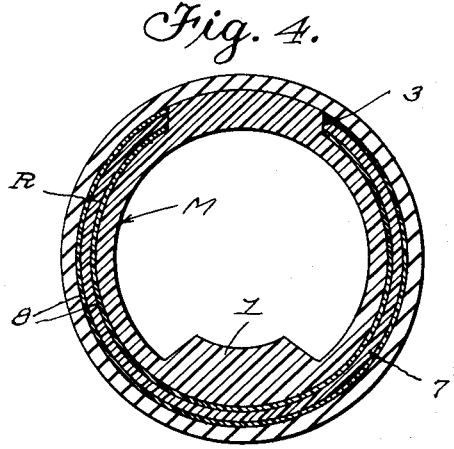
Figure 4 is a transverse sectional view taken through a tube and comprising a modified form of reinforcing means.
Figure 3:
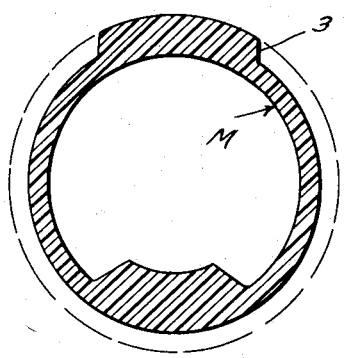
Figure 3 is a cross sectional view taken through the inner member of the tube unapplied, the associated reinforcing means being indicated by broken lines.
Figure 5:
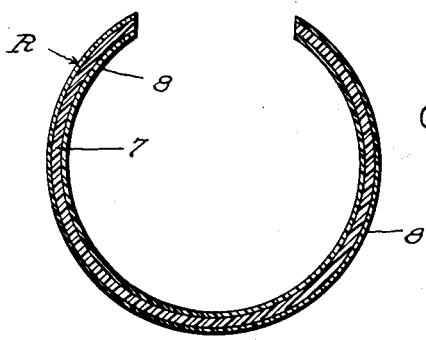
Figure 5 is a cross sectional view taken through the reinforcing means as embodied in Figure 4 and unapplied.

In the embodiment of the invention as illustrated in Figures 4 and 5 the reinforcing or protective element R comprises a central lamination 7 of a material similar to that of the member M with the sheets 8 of a desired textile plastic disposed over the opposite faces thereof and vulcanized thereto.

In the form of the invention as illustrated in Figure 6 the reinforcing and protecting element P comprises two superimposed sheets 9 interposed between the outer laminations 10 of a material similar to that of the member M. These superimposed sheets 9 are provided therethrough at points spaced thereover with the minute perforations 11 and each of these sheets is of a solidified textile or fiber plastic material suitably processed for high strength and dimensional stability. These perforations 11 provide effective means for holding the laminations 10 after the vulcanizing heat has been applied as such will cause material of the laminations 10 to enter the perforations.

In the production of the element E, the central sheet 4 is fully "oriented" equally in two directions which are fixed at right angles to each other, as indicated by the arrows $a$ in Figure 8 before "heat setting" the material to assure the utmost strength and stability. With respect to the element R the sheets 8 are "oriented" in diagonal relation to each other as indicated by the arrows $b$ in Figure 9 and it is to be stated that the intermediate lamination 7 may be of soft butyl or other synthetic rubber having an internal adhesive structure. The sheets 9 as comprised in the element P are also preferably "oriented" in diagonal relation to each other as indicated by the arrows c in Figure 10.

In the embodiment of the invention as illustrated in the accompanying drawings it is believed to be obvious that the shoulders 3 of the member M constitute seats against which the marginal portions of the elements E, R and P abut.

The reinforcing elements 4, 8 and 9 which are of relatively thin sheet or layer form are preferably cut from a much larger sheet which has been previously prepared by directional orientation of structure and heat setting of same. The reinforcing elements 8 and 9 are applied in use to serve in pairs, and said elements 8 and 9 are preferably cut on a bias with the direction of oriented structure, from the large prepared sheet above mentioned. The above mentioned reinforcing elements do not contain fabric, and therefore are not made of woven thread materials as said elements are made in solidified unit form from any textile or fiber plastic material as previously stated.

There are numerous types of fiber plastic materials. The better known types are nylon and rayon, however, there are other types identified by the names acrylic or polyester plastics.

From the foregoing description it is thought to be obvious that an inner tube or pneumatic tire constructed in accordance with my invention is particularly well adapted for use by reason of the convenience and facility with which it may be assembled and operated.

I claim.

1. An inner tube comprising an inner tubular envelope of rubber-like, tacky plastic material having a thickened tread portion and a thickened base portion, said base portion defining a pair of shoulders; a plurality of coextensive laminations secured on the external surface of said inner tubular envelope and extending across the tread portion of the inner envelope from shoulder to shoulder; said laminations comprising a first layer of non-woven substantially inelastic flexible sheet fabric material disposed adjacent said inner envelope, a second layer of rubber-like plastic material adjacent said first fabric layer, and a third layer of substantially inelastic flexible sheet fabric material disposed adjacent said second layer; and an outer tubular envelope of rubber-like stretchable elastic material secured over said third layer and thickened base portion.

2. The structure of claim 1, and wherein said inner tubular envelope is of soft synthetic rubber.

3. The structure of claim 1, and wherein said first and third layers comprise textile plastic sheet material.

4. The structure of claim 1, and wherein said second layer comprises soft synthetic rubber vulcanized to said first and third layers.

References Cited in the file of this patent

UNITED STATES PATENTS

| | | |
|---|---|---|
| 1,237,131 | Welch | Aug. 14, 1917 |
| 1,449,692 | Nall | Mar. 27, 1923 |
| 2,004,892 | Grieshaber | July 11, 1935 |
| 2,055,797 | Lomis | Sept. 29, 1936 |
| 2,339,542 | Hale | Jan. 18, 1944 |
| 2,342,580 | Hartz | Feb. 22, 1944 |
| 2,489,995 | Young | Nov. 29, 1949 |
| 2,664,936 | Waber | Jan. 5, 1954 |